Jan. 21, 1964     P. G. EXLINE     3,118,721
APPARATUS FOR ACCUMULATING AND RECORDING DIGITAL INFORMATION
Filed March 21, 1960     4 Sheets-Sheet 1
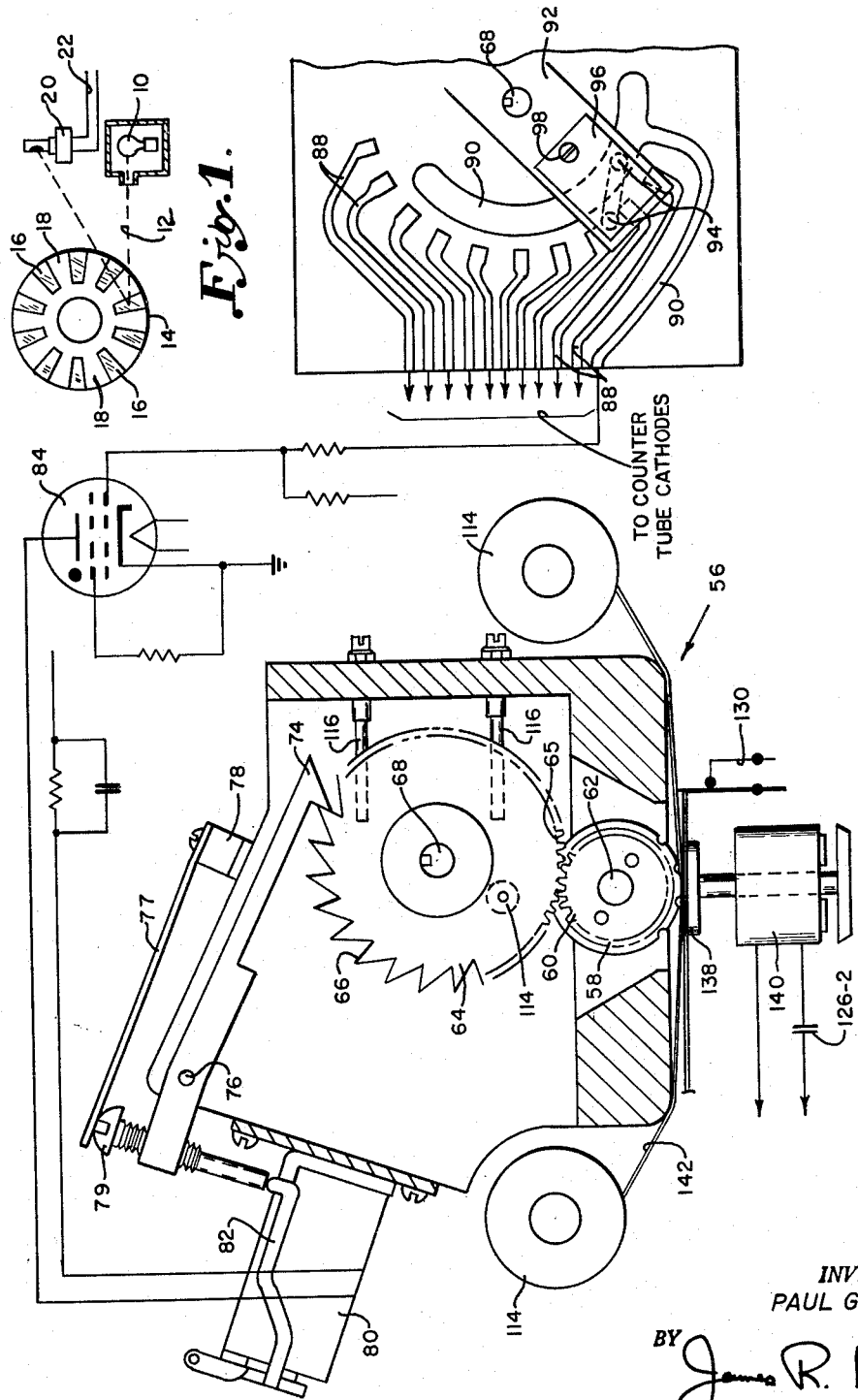
INVENTOR.
PAUL G. EXLINE
BY James R. Head
ATTORNEY

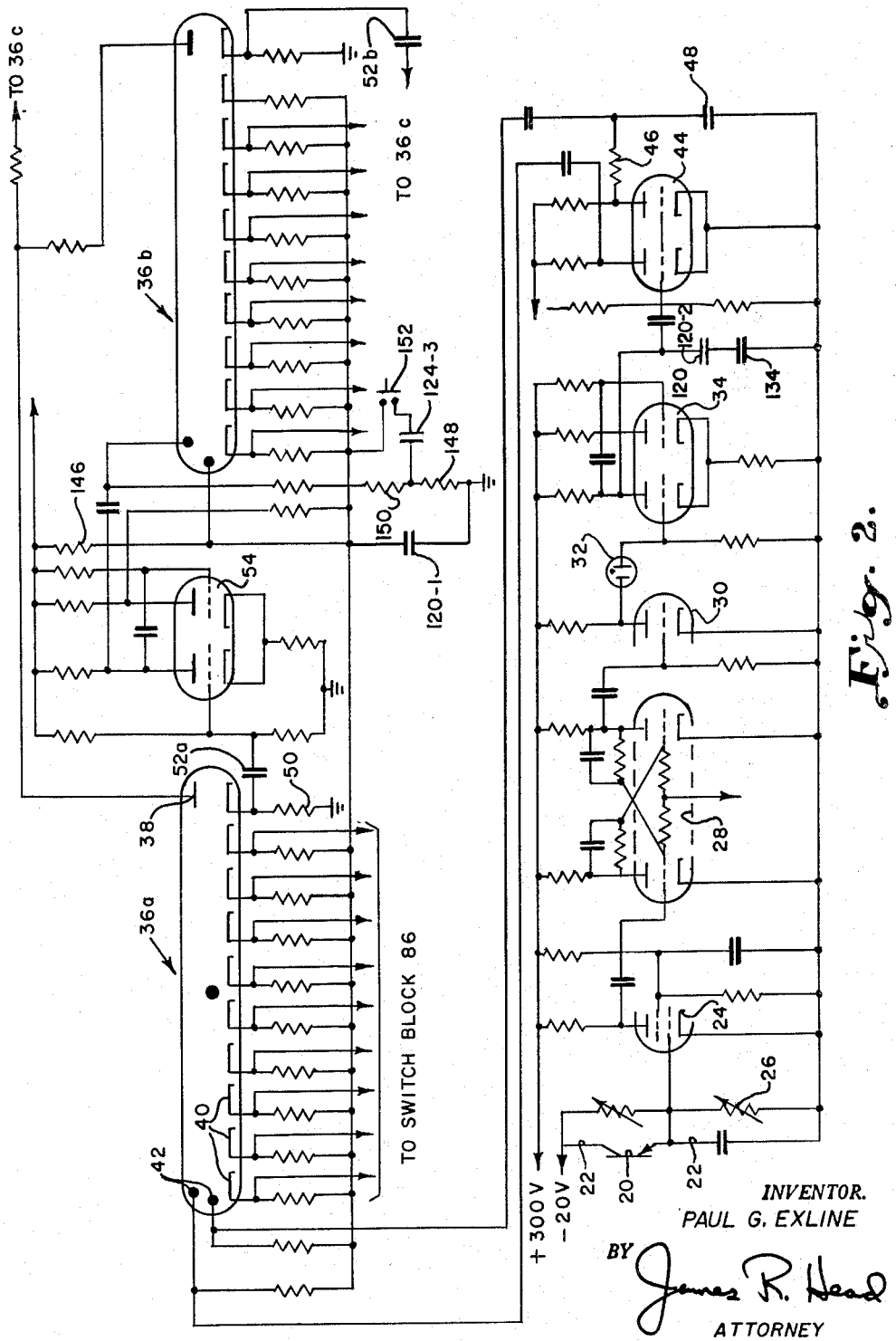

Jan. 21, 1964 P. G. EXLINE 3,118,721
APPARATUS FOR ACCUMULATING AND RECORDING DIGITAL INFORMATION
Filed March 21, 1960 4 Sheets-Sheet 3

INVENTOR.
PAUL G. EXLINE
BY
*James R. Head*
ATTORNEY

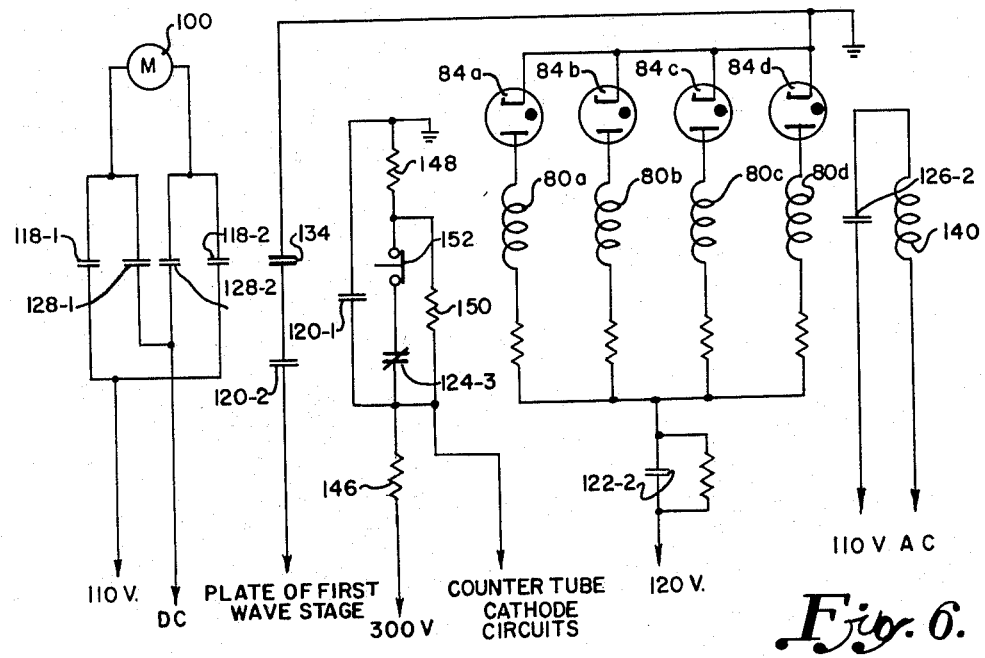
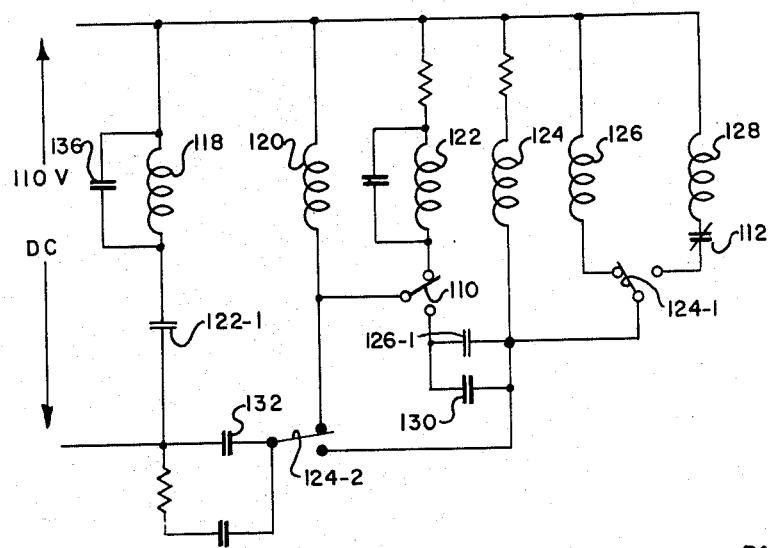

United States Patent Office 3,118,721
Patented Jan. 21, 1964

3,118,721
APPARATUS FOR ACCUMULATING AND RECORDING DIGITAL INFORMATION
Paul G. Exline, 1625 S. Norfolk Ave., Tulsa, Okla.
Filed Mar. 21, 1960, Ser. No. 16,288
1 Claim. (Cl. 346—14)

This invention relates to a read out counter and imprinter. More particularly, the invention relates to a novel method of detecting circuit charges, totalizing the number of circuit changes, presenting a visual indication of the total number of circuit changes, transferring the visually indicated number of circuit changes into a mechanical printing device, and printing the total number of circuit changes accumulated onto a paper.

In many industrial operations it is necessary to total or sum quantities. Although the novel features of this invention have a wide application in inductry, for purposes of clarity and as a specific example of the application of the invention disclosed herein, this device will be described as particularly applies to an integrating mechanism.

In the oil industry it is frequently necessary to integrate certain physical values to arrive at a common value on which a total market price may be established. One example of this is in the delivery of gas through a pipeline and meter where the volume of gas is continuously varying due to changes in the pressure and velocity. In most flow measurement problems, especially when using an orifice plate metering apparatus, total flow of a fluid is represented by the formula:

$$Q = C\sqrt{hp}$$

where C represents a constant based on the orifice diameter, Reynolds number of the fluid, contraction and velocity coefficient, etc., while $h$ represents the differential pressure across the orifice and $p$ represents the static pressure at the orifice. Using suitable and well known means, $h$ and $p$ are separately recorded on time charts. In order to arrive at a total quantity of flow, Q, these values must be integrated in accordance with the standard formula, with respect to the total time involved.

Machines for performing this integration are commonly used in the gas industry. Typically, the integrated value is derived by the total number of rotations of a differential friction clutch where small integrating wheel rotates on a constantly moving disc. The total number of rotations depends on the distance of the wheel from the center of the disc. Under present usage, the integrator wheel is connected to a small mechanical counter whereby each revolution is indicative of so many units of volume. In operation, charts on which records have been made by a gas measuring meter, are placed on the integrating machine and an operator manually moves devices to follow the recorded ink line fluctuations in differential and static pressure changes as the chart is rotated. These changes are mechanically detected by the number of rotations of the integrator wheel. When the chart has been rotated through 360 degrees or the amount of time desired, the operator removes the chart. By subtracting the number on the mechanical counter at the beginning of the chart rotation from the number on the counter at the end of the chart rotation, the total number of revolutions of the integrator wheel, or corresponding valume, is obtained.

This system, wherein operators are required to note and subtract the counter readings and manually record them on charts introduces a possibility of error. Also, reading the counter and writing onto the chart the figures computed is time consuming. Since economical and legal requirements demand accurate flow measurements, possibility of errors must be overcome.

Accordingly, one object of this invention is to provide apparatus which overcomes the objections and errors produced by counting mechanism presently in use.

It is therefore an object of this invention to provide a novel mechanism which will count and digitally accumulate a total number of actuations from a circuit control device.

Another object of this invention is to provide a counting mechanism which presents a visual record of a total number of circuit changes over an interval of time.

Another object of this invention is to provide a mechanism which will count and accumulate a total upon the actuation of a circuit control device and print the accumulated total on a sheet of paper.

Another object of this invention is to provide apparatus for transferring a multi-digit number from an electronically actuated visual indicator and information storage to a mechanical printer.

Another object of this invention is to provide a device which will automatically count and accumulate events, transfer the accumulated number to a mechanical printer, print the number on a sheet of paper and automatically reset itself to be in condition for another count and accumulation.

Another object of this invention is to provide a device which will detect changes in light intensities, count the number of such changes, present a visual record of the number of such changes, transfer the number automatically to a mechanical printer, print the number on a sheet of paper, and re-set itself to a beginning condition to count the next series of light intensity changes.

Another object of this invention is to provide a device which, when coupled to an integrator mechanism, would automatically transfer the integrated total to a visual numerical indicator and to a mechanical printing device. The printing apparatus is energized by inserting the paper to be imprinted upon into the device.

These and other objects and a better understanding of this invention may be had by referring to the following description and claims taken in conjunction with the attached drawing, in which:

FIGURE 1 is a schematic representation of one means of this invention whereby a variable electrical signal is generated, as for example, a function of the number of rotations of an integrator totalizer wheel.

FIGURE 2 is a schematic diagram of the electronic counting circuit of the invention whereby circuit changes are detected and electronically accumulated.

FIGURE 4 is a side view of the printer mechanism of this invention combined with a part of the control circuit whereby numbers are transferred from the electronic computing component to the mechanical printer.

FIGURE 6 and FIGURE 7 are schematic diagrams showing the control functions of the various relays and switches of the mechanism.

Figure 5:
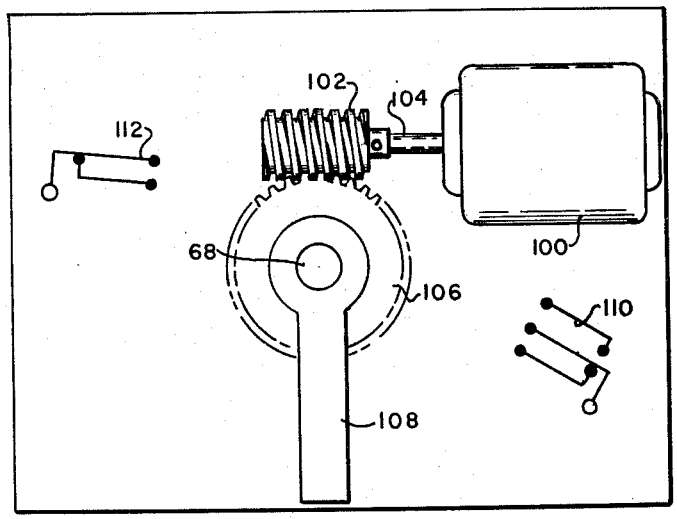
FIGURE 5 is an end view of a mechanical printer showing the stop control mechanisms.

Briefly, this invention may be defined as a multi-digit read out counter wherein circuit changes may be counted and recorded on a paper including a circuit change detector and amplification means; multi-digit counter tubes disposed to receive and count the circuit changes as amplified; a mechanical printer having individually controlled digits whereby the number on said wheels correspond to number on said counter tubes. A print actuator transfers the numbers to a paper or chart.

Referring now to the drawings, and first to FIGURE 1, a light source 10 is shown directing a beam of light 12 onto a rotating reflector disk 14. The disk 14 comprises alternately spaced reflecting areas 16 and non-reflecting areas 18. The reflecting areas 16 will have a mirror like surface whereas the non-reflecting areas will have a black or light absorbing surface. The reflecting disk 14, for purposes of explanation of this invention would be affixed to the small integrator wheel or shaft not shown. As the integrator wheel and reflecting disk 14 is rotated, light beam 12 emitting from light source 10 will be reflected in an alternate pattern such that there will be ten reflection signals of each revolution of the wheel followed by intermediate points of low or no reflection intensity. Reflected light is detected by a photo-diode 20 for example. The inherent characteristic of a photo-diode is such that its internal electrical resistance varies inversely in proportion to the amount of light striking it. Accordingly, a variable electrical signal is generated by the application of the voltage on the conductors 22 of the photo diode 20.

In the circuit diagram of FIGURE 2, the photo-diode 20 is positioned in a circuit such that its variable resistance offered by it causes a voltage fluctuation on the grid of amplifier tube 24. A sensitivity control 26 (variable resistor) is provided whereby a portion of the signal generated by photo-diode 20 is selected to be impressed on the grid of amplifier tube 24. The varying signal of photo-diode 20, after amplification in amplifier 24 is fed into the grid of the first section of a bistable multivibrator 28. The output of the second stage of the bistable multivibrator 28 is fed into the grid of a pulse former tube 30. Affixed to the plate circuit of the pulse former tube is a neon tube 32. The function of the neon tube is to provide a substantially square wave shape voltage output conforming to the alternate positions of high intensity light reflection and low intensity light reflection of reflector disk 14. When the grid of pulse former tube 30 becomes more negative, current flow through the tube will be reduced and the voltage at the plate will increase. As the voltage increases neon tube 32 will fire or ionize, causing a high voltage to be placed on the grid of wave shaper tube 34. As pulse former tube 30 begins to conduct more current the voltage across the plate will drop to the point where neon tube 32 will no longer be ionized and the voltage will be removed from the grid of the wave shaper tube 34. Tube 34 is a two element tube and its circuitry constitutes in effect a monostable multivibrator producing an output wave of a substantially square form corresponding to the alternate high and low intensity light reflections from the reflector disk 14. Thus, if disk 14 is rotated at a relatively fast rate, the output square waves from tube 34 will be fast. Conversely, if reflector disk 14 is rotated at a very slow rate, the output square waves of wave shaper tube 34 will be very slow and if the reflector disk 14 is not moving at all, no voltage changes will occur at the output of wave shaper tube 34. This portion of the circuit in effect detects the rotation of reflector disk 14 and converts it into a number of square waves indicative of each rotation of reflector disk 14. It is understood that the circuitry associated with tubes 24, 28, 30 and 34, is, by way of example only, and that many alternate circuitry arrangements are available to produce and amplify voltage values from the photo-diode 22 signal input.

The next requirement is to count the number of square wave pulses at the output of the wave shaper tube 34. This is accomplished by the use of decade type counter tubes 36. This tube is described as a cold cathode, bi-directional decade counter tube. Briefly, the principle of operation may be said to constitute the movement of a glow discharge from one electrode to the next upon receiving a pulse. Actually, the counter tube has one anode 38, ten primary cathodes 40 and twenty secondary cathodes 42, spaced two each, between the primary cathodes 40. As successive pulses are received by the counter tube 36, a glow discharge is caused to pass from one cathode to another on each positive pulse by the intermediate ionization of the secondary cathodes 42. Thus, with each pulse received from wave shaper tube 34, the glow from the anode 38 to one of the cathodes 40 is caused to move in successive order from one to another. This is accomplished by unit driver stage tube 44. It can be seen that the square wave output from wave shaper tube 34 is fed into the grid of both sections of unit driver stage tube 44. This causes a simultaneous output on the plates of these tubes. However, it will be noted that the resistor 46 and a condenser 48 in one stage of the plate circuit of unit driver stage tube 44 will cause a time delay or time lag on the plate output from this stage. The output from both plates is fed into all of the secondary cathodes of the counter tube 36. As successive pulses are fed into unit drive stage tube 44 the glow discharge and the unit counter tube will travel from position 1 successively to position 0 or 10. When it reaches position 10 a glow will exist from anode 38 to the last cathode 40 of position 10 causing a current flow through its cathode 40 and its cathode resistor 50, creating a voltage thereon. This voltage is fed from cathode resistor 50 by capacitor 52a into the input circuit of the tens driver stage tube 54 which drives the tens counter tube 36b so that each pulse received on a tens drive stage 54 will move the glow of tens counter tube 36b from one cathode to another. In succeeding manners a hundredths driver stage tube (not shown) is provided feeding a hundredths counter tube (not shown) and which counter tube in turn feeds a thousandths driver stage tube and a thousandths counter tube (not shown). This can be continued for as many digits as are required in the total number. For instance, if four counter tubes 36 are provided, the highest number which can be counted and indicated would be 9,999. If a maximum number required was 99,999, then five counter tubes 36 would be required, each preceded by a driver stage tube.

Figure 3:
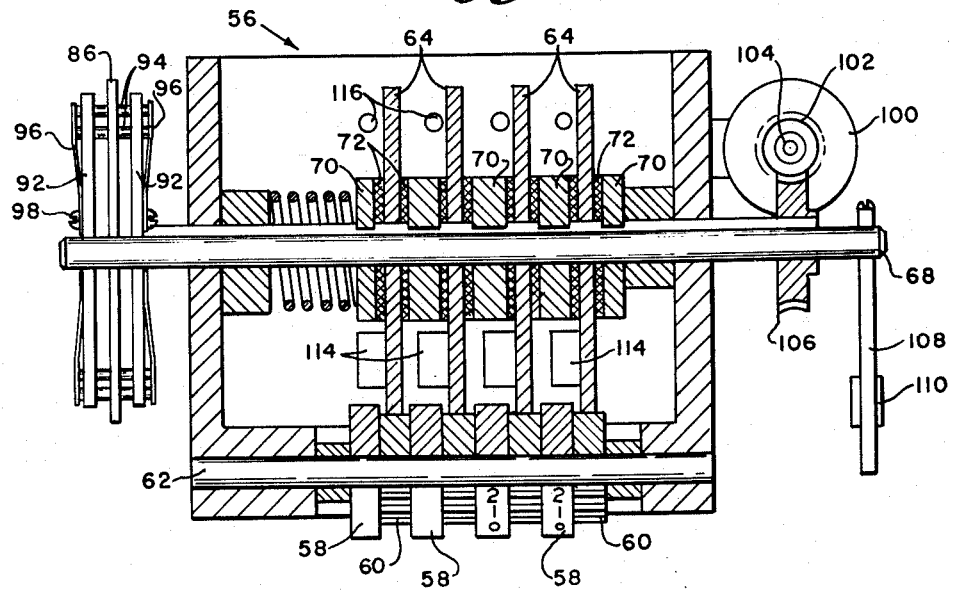
FIGURE 3 is a cross-sectional view of the mechanical printer.

The glow from the anode 38 to the cathode 40 of the driver tubes 36 is visible and a printed dial enables the operator to look at the counter tubes 36 at all times and be able to read visually the total numbers which have been counted. However, in order to eliminate any chance of human error in translating or mistranslating numerals the next phase of this invention provides the conversion of the total number which have been counted on the counter tubes 36 to a physical reading on a printer mechanism which will automatically print the total number counted onto a sheet of paper when properly actuated. The mechanism for accomplishing this result is best shown in FIGURES 3 and 4.

The printer of this invention, indicated generally by the numeral 56, consists of a series of print wheels 58 which have the numerals 1 through 0 engraved thereon, partially shown. Affixed to each print wheel 58 is a gear 60. The print wheels 58 with their attached gears 60 are mounted to be independently rotated on shaft 62. Engaging print gears 60 is a combined ratchet and gear wheel 64. Ratchet gear 64 has approximately half of its circumference formed into gear teeth 65 which directly engage print gear 60 and the other half of the circumference of ratchet gear 64 is made up of ratchet gear teeth 66. A combined system of ratchet and gear wheel 64, print wheel 58 and gear 60 is provided for each digit desired. Ratchet and gear wheels 64 are mounted on a shaft 68. Secured to the shaft are friction clutches 70. Positioned between friction clutches 70 and ratchet and gear wheels 64 are friction washers 72. As shaft 68 is rotated, the friction imparted through friction clutches 70 and friction washers 72 causes ratchet gear 64 to turn, which, causes print wheels 58 to turn. However, if one or all of the ratchet gears 64 is held in a fixed position at any point during the rotation of shaft 68, print wheels 58 will likewise stop rotation. The shaft 68 and the clutches 70 may continue rotation. Accordingly, if all of the print wheels 58 are in a given beginning position and shaft 68 is rotated, the ratchet gears may be stopped at various positions with different numerals placed in printing position.

The gears 64 are prevented from rotation and accordingly set up a predetermined figure on printing wheels 58 by a relay actuated pawl 74, disposed to engage ratchet teeth 66. Pawl 74 is pivoted about shaft 76. A cantilever spring 77 is attached to the printer housing 56 at 78. The free end of the spring operates against adjustment screw 79 attached to the rear extension of pawl 74 to normally bias the pawl out of engagement with its appropriate ratchet gear 64. A solenoid 80, having a relay arm 82, is disposed to engage screw 79 such that when solenoid 80 is energized, pawl 74 will be rocked against the pressure spring 78 to engage sprocket teeth 66. Thus it can be seen that as shaft 68 is rotated, solenoids 80 may be energized at the proper time sequence to stop the movement of ratchet wheel 64 and consequently stop print wheels 58 in predetermined positions.

It should be noted that a solenoid 80 and its associated pawl 74 is provided for each of the ratchet and gear wheel 64. In the diagrammatic circuit of FIGURE 4, each solenoid 80 is controlled by a tube 84 such that when it is caused to conduct, solenoid 80 is energized, and vice-versa. Therefore, the control of the grid of relay tube 84 in an accurate time relationship with reference to the rotation of shaft 68 is necessary in order to secure the transformation of numerals from the electronic status as stored in counter tubes 36 to the mechanical status as would be indicated by the position of print wheels 58.

Affixed non-rotatively about shaft 68, as best shown in FIGURES 3 and 4, is multi-switch block 86. The switch block as particularly described herein includes printed circuits, which has proven successful and is of configuration generally indicated in FIGURE 4. The view is a partial elevation of one switch circuit on one side of switch block 86, i.e., there are two switch circuits similar to that shown on each side of block 86 for a total of four switch circuits, corresponding to the four digit system. The body of the scanning switch is typically an insulated base such as Bakelite or the like, with each separate switch circuit comprising ten isolated contacts 88 and a common contact 90. The circuits are preferably concentric with respect to the shaft 68 and sandwiched between scanning switch arms 92 which are affixed to shaft 68 and rotated therewith as hereinafter described. At the outer extremes of each scanning switch arm 92 are switch contact points 94, which are small conductive elements. Contact is maintained between the switch contact points 94 in each switch arm 92 by a conductive plate 96 secured to switch arm 92 by a screw 98. Plate 96 also serves as a spring tension device exerting continuous pressure against contact points 94 to cause them to engage common path 90 and the isolated paths 88 of each pole on block 86 when rotated.

The grid of relay tube 84 is connected to common contact 90 and, by means of switch contact points 94, to the ten different isolated positions 88 of switch block 86. Each isolated path 88 of switch block 86 is in turn connected to a cathode position of counter tube 36, described in FIGURE 1.

As arm 92 rotates, contact points 94 will provide continuity between the grid of relay tube 84 and the cathodes of counter tube 36 in sequence. The cathode 40 of counter tube 36 which is glowing, indicating the number which it has reached in the counting processes, will have a voltage across it. Thus, when switch arm 92 reaches the position corresponding to the numerical cathodes 40 of counter tube 36 which is glowing, a voltage will be applied to the grid of solenoid tube 84 causing relay 80 to energize, forcing pawl 64 to engage the appropriate tooth 66 of ratchet gear 64. By coordination of the position of the ratchet teeth 66 with pawl 74 compared to the position of switch arm 92, the rotation of ratchet wheel 64 will be stopped at a point such that the proper number will be in printing position on print wheel 58, corresponding to the cathode number 40 at which the glow of counter tube 36 then exists. It should be remembered that as shaft 68 is rotated, this event will occur with respect to the four counter tubes 36, through four different pole circuits, and four different relays 84. In this manner the number accumulated by the rotation of the reflector disk 14 which is visibly displayed on counter tubes 36 is translated into mechanical alignment of the identical numbers on counter wheels 58.

By referring to FIGURE 5, it can be seen that motor 100 has a worm gear 102 affixed to its output shaft 104. Worm gear 102 engages gear 106 which in turn is secured to shaft 68. The motor is typically of a reversible type such that after a scanning operation, shaft 68, switch arm 92 and ratchet gears 64 are reversed to the starting position. Affixed to shaft 68 is a limit switch contact arm 108. Positioned within the rotative path of arm 108 are two limit switches, diagrammatically shown, a stop limit switch 110 and a reversing limit switch 112.

It will be noted that ratchet gears 64 have stop buttons 114 affixed to the sides thereof. Adjustable stop points 116 are provided (see FIGURE 4) protruding along the side of each ratchet gear 64 to engage stop buttons 114 for each limit of rotation of ratchet gear 64. Stop points 116 are adjusted so that ratchet gear 64 stops in its proper position, both at its maximum position of rotation and at its beginning position. This insures the proper alignment between the position of ratchet gear 64 and switch arms 92 so that the correct number will be placed on printer wheel 58.

In order to control the electronic counter mechanisms of FIGURE 1 and the mechanical printing mechanisms of FIGURES 2, 3, and 4, a novel system of control has been devised. This control system is best shown in the schematic diagram of FIGURES 6 and 7. Six relays cooperate to perform the automatic functions of the control portion of the mechanism: motor relay 118, count holder relay 120, plate voltage relay 122, reset relay 124, holding relay 126, and motor relay 128.

Four switches are used in the control circuitry. Switches 110 and 112 (see FIGURE 5) which are limit switches actuated by limit arm 108 affixed to shaft 68. Switch 132 is a manually operated switch (see FIGURE 7) which is open during the counting process, while the integrator is being operated and which is automatically closed when the integrator completes one complete rotation. The closing of switch 132 begins the control cycle upon the termination of integration such that the reading which accumulated on counter tubes 36 will be transferred to the printer 56. Switch 130 (see FIGURE 4) is provided to actuate the printing mechanism when a chart or paper is inserted within the printer.

In operation, when the chart has been fully integrated and the count accumulated, switch 132 is automatically closed, bringing voltage to the coils of relays 120 and 122, causing these relays to close. Contact 120-2 closes, placing capacitor 134 to ground upon the plate of the first stage of wave shaper tube 34. This serves to shunt to ground any signal which is developed on this plate, preventing the accumulation of any additional numbers on the counting tubes 36. At the same time, contacts 120–1 shunts to ground the cathode voltage existing on the cathodes for all the counter tube numbers except the number zero cathode.

When plate voltage relay 122 is energized, contact 122–2 closes, placing a 120 volt source into series with the plate circuits of all of the relay tubes 84. Contact 122–1 closes to put voltage on the coil of motor relay 118. Capacitor 136 in parallel with 118 effects a small time delay making certain that contact 122–2 closes to put voltage on the plates of relay tubes 84 so that they are ready to be actuated before relay 118 closes. When relay 118 closes, the scanning motor 100 is energized by closure of contacts 118–1 and 118–2. Thus the relay tubes 84 are energized as the scanning motor 100 rotates shaft 68 to set up the reading on print wheels 58.

At the end of the scan, which takes about one-half second, limit arm 108 on shaft 68 engages limit switch 110 breaking the normally closed contact. This causes voltage to be transferred from relay 122 which breaks contact 122–1 resulting in the release of voltage across relay 118. Release of relay 118 opens contacts 118–1 and 118–2 which interrupts the voltage to scanning motor 100 causing it to stop. Scanning motor 100 will coast and the inertial rotation will be taken up by the slip means existing between friction clutches 70 and friction washers 72.

When switch 110 is transferred, voltage is placed on the contacts of print switch 130. At this instant the count has been transferred from the counter tubes 36 to the print wheels 58 of the printing mechanism 56 in position to mechanically print the total which is visibly shown on counter tubes 36.

The paper or chart is inserted below the counter wheels 58 engaging print switch 130 (see FIGURE 4). When switch 130 is closed voltage is placed across the coil of relay 126, causing this relay to actuate. When contact 126–1 closes, it parallels switch 130 to lock voltage on relay 126 to keep it in a closed position. This insures against premature opening of switch 130 as the paper is struck by printing hammer 138. When relay 126 is energized contact 126–2 is closed, see FIGURE 4, placing voltage on printing solenoid 140 to cause printing hammer 138 to raise and force the paper against printing wheels 58 whereby ink from a printing ribbon 142 is transferred to the paper, permanently printing the number thereon. Ribbon 142 is automatically advanced on ribbon rollers 144 by a mechanism, not shown.

Upon the closing of print switch 130, current is placed upon the coil of relay 124. Relay 124 is a slow operating relay so that the transfer of contact 124–1, which serves to release relay 126, gives printing solenoid 140 time to complete its function. Since the actuation of printing hammer 138 is more or less instantaneous it is necessary only to provide a time delay in the closing of relay 124 for approximately 7/100 of one second. The operation of relay 124 causes contact 124–2 to transfer the path of current from limit switch 110 directly to the coil of relay 124. Contact 124–1 brings current to the coil of relay 128, which closes switch contact points 128–1 and 128–2, reversing the current flow into scanning motor 100 and causing it to rotate to its original position, bringing with it ratchet gears 64 and printing wheels 58 to their beginning positions.

As scanning motor 100 starts its reversed direction, stop limit switch 110 is returned to its normal position. Voltage is removed from the common terminal of switch 110 by contact 124–2 so that relays 122 and 188 cannot be energized. At the end of the return travel of scanning motor 100, limit switch 112 is opened by arm 103, opening the switch contact 112, deenergizing relay 128 and opening switches 128–1 and 128–2 so that scanning motor 100 is deenergized. This stops the rotation of scanning motor 100 and it coasts to its original starting position.

At this position only relay 124 has voltage across its coil. The circuit remains in this condition until switch 132 is opened to start the next counting cycle.

When relay 124 is energized, contact is broken between normally closed contact switch 124–3. It is to be noted that when 124–3 is closed, a voltage divider circuit is maintained between resistor 146 which in practical application is a 470,000 ohm resistor, and resistor 148 which in practical application is a 6,800 ohm resistor. Thus a small voltage of about 15 volts is applied to the cathodes of counter tubes 36. A resistor 150 which has a value of approximately 1,000,000 ohms is shorted by contact 124–3. However, when contact 124–3 is opened, resistor 150 is placed in series with resistor 148 so that the voltage divided between resistor 146 increases from about 15 volts to about 200 volts. This means that a high positive voltage is placed on all the cathodes of counter tubes 36, except zero cathodes which are at ground potential. This high positive voltage on the nine cathodes in each counter tube causes the ionization to seek the point of greatest differential between one of the cathodes and the anode circuit. Since the figure zero cathode is grounded the greatest potential will exist between it and the anode so that the glow will seek and settle on the zero position. This will occur in all of the counter tubes 36 simultaneously. Thus it can be seen that when relay 124 is energized, opening contact 124–3, all of the counter tubes 36 will return to the zero position, placing them in condition for the next counting cycle. It is noted that relay 124 does not energize to open circuit 124–3 causing the tubes to return to zero positions until after the values on counter tubes 36 have been transferred to the counting mechanism 56 and the counting mechanism has been energized to record the indicated figures.

A manual reset switch 152 is provided which duplicates the function of contact points 124–3, whereby pressing switch 152 breaks the circuit to cause all tubes to go to zero position. This feature is provided so that the operator at any time may reset the machine for a new counting procedure.

The control circuitry using relays 118 to 128 and switches 130 and 132 provide an automatic system whereby a total number, accumulated on counter tubes 36 is transferred to the printer mechanism 56, which is transferred to a paper when the paper is inserted to engage switch 130, and resets itself to the zero position 84 for the next counting operaiton.

Although this invention has been described with a certain degree of particularity, it is manifest that many changes may be made in the details and construction, the arrangement of components, and the circuitry arrangement, without departing from the spirit or the scope of this disclosure.

I claim:

Apparatus for recording accumulated pulse count on paper or the like, comprising in combination,
    a counter tube for each digit of said count for visibly accumulating said pulses, each tube having indicating electrodes representing the digits zero through nine;
    switch means for interrupting said pulses to said counter tubes after a predetermined time interval;
    means to sequentially scan and connect simultaneously each of said indicating electrodes of each tube, in the order of digits nine through one, to a power control means;
    solenoid means for each of said counter tubes to be actuated when said scanning means connects that indicating electrode of each tube having said accumulated pulse digit with said power control means;
    an imprinter co-acting with rotatable ratchet gears for each corresponding counter tube;
    means to rotate said scanning means and said ratchet gears in synchronization after operation of said switch means;

pawl means associated with each of said ratchet gears actuated by said solenoid means to stop rotation of said ratchet gears and imprinters;

limit means to stop rotation of each of said gears in that instance the zero electrode of each counter tube has said accumulated pulse digit;

slip clutch means associated with said means to rotate to permit relative rotation of said ratchet gears; and circuit means actuated by said paper or the like to print said accumulated count and substantially thereafter reset said apparatus for accumulating the next count.

References Cited in the file of this patent

UNITED STATES PATENTS

| | | |
|---|---|---|
| 874,424 | Ohmer | Dec. 24, 1907 |
| 2,431,651 | Spencer | Nov. 25, 1947 |
| 2,620,980 | Brown | Dec. 9, 1952 |
| 2,682,995 | Carey et al. | July 6, 1954 |
| 2,733,008 | D'Andrea et al. | Jan. 31, 1956 |
| 2,796,830 | Hilton | June 25, 1957 |
| 2,862,114 | Solomon | Nov. 25, 1958 |